(12) United States Patent
Hiron et al.

(10) Patent No.: US 10,873,764 B2
(45) Date of Patent: Dec. 22, 2020

(54) METHOD FOR ENCODING AN INPUT VIDEO COMPRISING A LUMA COMPONENT AND TWO CHROMA COMPONENTS, THE METHOD COMPRISING RESHAPING OF SAID INPUT VIDEO BASED ON RESHAPING FUNCTIONS

(71) Applicant: INTERDIGITAL MADISON PATENT HOLDINGS, SAS, Paris (FR)

(72) Inventors: Franck Hiron, Chateaubourg (FR); Edouard Francois, Bourg des Comptes (FR); Christophe Chevance, Brece (FR); Pierre Andrivon, Liffre (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/301,007

(22) PCT Filed: May 5, 2017

(86) PCT No.: PCT/EP2017/060766
§ 371 (c)(1),
(2) Date: Nov. 13, 2018

(87) PCT Pub. No.: WO2017/194405
PCT Pub. Date: Nov. 16, 2017

(65) Prior Publication Data
US 2020/0186839 A1    Jun. 11, 2020

(30) Foreign Application Priority Data
May 13, 2016 (EP) .................................. 16305562

(51) Int. Cl.
H04N 19/70 (2014.01)
H04N 19/186 (2014.01)
H04N 19/85 (2014.01)

(52) U.S. Cl.
CPC .......... H04N 19/70 (2014.11); H04N 19/186 (2014.11); H04N 19/85 (2014.11)

(58) Field of Classification Search
None
See application file for complete search history.

(56) References Cited

U.S. PATENT DOCUMENTS 9,571,838 B2 *  2/2017  Sato ..................... H04N 19/105
10,129,558 B2 * 11/2018  Ramasubramonian ......................
                                                          H04N 19/463

(Continued)

FOREIGN PATENT DOCUMENTS

WO   WO-2016108268 A1 *  7/2016  .......... H04N 21/434
WO   WO-2017129793 A1 *  8/2017  .......... H04N 19/117

OTHER PUBLICATIONS

Ramasubramonian et al., "CE-1 related: Usage of CRI SEI message for range adjustment", Document MPEG2015/37286, Oct. 14, 2015. (Year: 2015).*

(Continued)

*Primary Examiner* — Reza Aghevli
(74) *Attorney, Agent, or Firm* — Invention Mine LLC

(57) ABSTRACT

The present principles relates to a method and device for encoding an input video comprising a luma component and two chroma components. The method comprises: —reshaping of said input video by applying (610) piece-wise linear functions to the luma and chroma components; —encoding (620) the reshaped video into a bitstream; and —encoding (630) parameters representative of said piece-wise linear functions as side information; and the method is characterized in that reshaping of said input video further depends on (Continued)

a targeted range of a decoded reshaped video and the range of a reconstructed video after an inverse-reshaping is applied on the decoded reshaped video.

17 Claims, 5 Drawing Sheets

(56) References Cited

U.S. PATENT DOCUMENTS

| | | | | |
|---|---|---|---|---|
| 10,542,289 | B2* | 1/2020 | Yin | H04N 19/186 |
| 10,609,395 | B2* | 3/2020 | Kerofsky | H04N 19/157 |
| 2014/0210847 | A1* | 7/2014 | Knibbeler | H04N 9/68 |
| | | | | 345/589 |
| 2015/0178904 | A1* | 6/2015 | Boitard | G06T 5/007 |
| | | | | 382/274 |
| 2015/0221280 | A1* | 8/2015 | Van Der Vleuten | G06T 5/002 |
| | | | | 382/167 |
| 2015/0365580 | A1* | 12/2015 | Kunkel | H04N 5/2352 |
| | | | | 348/234 |
| 2016/0012573 | A1* | 1/2016 | Boitard | G06K 9/4661 |
| | | | | 382/274 |
| 2016/0189409 | A1* | 6/2016 | Aiba | G06K 9/4661 |
| | | | | 345/629 |
| 2016/0203618 | A1* | 7/2016 | Li | G06T 5/009 |
| | | | | 345/591 |
| 2016/0205369 | A1* | 7/2016 | Wallace | G06T 5/009 |
| | | | | 348/571 |
| 2016/0205370 | A1* | 7/2016 | Wallace | H04N 9/68 |
| | | | | 348/571 |
| 2016/0205371 | A1* | 7/2016 | Wallace | G06T 5/007 |
| | | | | 348/571 |
| 2016/0205372 | A1* | 7/2016 | Liu | G06T 5/009 |
| | | | | 348/453 |
| 2017/0078706 | A1* | 3/2017 | Van Der Vleuten | G06T 5/009 |
| 2017/0111643 | A1* | 4/2017 | Bugdayci Sansli | H04N 19/184 |
| 2017/0111661 | A1* | 4/2017 | Boyce | H04N 19/85 |
| 2017/0311034 | A1* | 10/2017 | Nishi | H04N 7/0125 |
| 2018/0020128 | A1* | 1/2018 | Tsukagoshi | H04N 19/70 |
| 2018/0115777 | A1* | 4/2018 | Piramanayagam | H04N 19/68 |
| 2018/0167637 | A1* | 6/2018 | Yin | G06T 5/007 |
| 2018/0211369 | A1* | 7/2018 | Leleannec | H04N 19/30 |
| 2018/0232867 | A1* | 8/2018 | Park | H04N 5/235 |
| 2018/0242006 | A1* | 8/2018 | Kerofsky | H04N 19/186 |
| 2018/0276801 | A1* | 9/2018 | Stessen | H04N 9/64 |
| 2018/0278967 | A1* | 9/2018 | Kerofsky | H04N 19/186 |
| 2019/0014331 | A1* | 1/2019 | Li | H04N 19/117 |
| 2019/0215517 | A1* | 7/2019 | Ramasubramanian | H04N 19/124 |

OTHER PUBLICATIONS

Boyce et al., "Draft high efficiency video coding (HEVC) version 2, combined format range extensions (RExt), scalability (SHVC), and multi-view (MV-HEVC) extensions", Joint Collaborative Team on Video Coding (JCT-VC) of ITU-T SG 16 WP 3 and ISO/IEC JTC 1/SC 29/WG 11, Document JCTVC-R1013_v6, Sapporo, Japan, Jun. 30, 2014, pp. 1-541.

Lu et al., "HDR CE2: CE2.a-2, CE2.c, CE2.d and CE2.e-3", Joint Collaborative Team on Video Coding (JCT-VC) of ITU-T SG 16 WP 3 and ISO/IEC JTC 1/SC 29/WG 11. Document JCTVC-W0084, San Diego, California, USA, Feb. 19, 2016, pp. 1-7.

Minoo et al., "Description of the Exploratory Test Model (ETM) for HDR/WCG extension of HEVC", Joint Collaborative Team on Video Coding (JCT-VC) of ITU-T SG 16 WP 3 and ISO/IEC JTC 1/SC 29/WG 11, Document JCTVC-W0092r1/m37732, San Diego, California, USA, Feb. 19, 2016, pp, 1-4.

Ramasubramonian et al., "CE1 related : Usage of CRI SEI message for range ajustement", International Organisation for Standardisation, ISO/IEC JTC1/SC29/WG11, Coding of Moving Pictures and Audio, Document ISO/IEC JTC1/SC29/WG11 MPEG2015/M37286, Geneva, Switzerland, Oct. 2015, pp. 1-4.

Ramasurbamonian et al., "Clarifications on the semantics of CRI SEI message and its usage for HDR/WCG video compression", Joint Collaborative Team on Video Coding (JCT-VC) of ITU-T SG 16 WP 3 and ISO/IEC JTC 1/SC 29/WG 11, Document JCTVC-V0064, Geneva, Switzerland,Oct. 15, 2016, pp. 1-3.

Andrivon et al., "AVC update with Colour Remapping Information SEI message", International Organisation for Standardisation, ISO/IEC JTC1/SC29/WG11, Coding of Moving Pictures and Audio, Document ISO/IEC JTC1/SC29/WG11 MPEG2015/M35665, Geneva, Switzerland, Feb. 2015, pp. 1-8.

Andrivon et al., "Colour Remapping Information SEI message for AVC", International Organisation for Standardisation, ISO/IEC JTC1/SC29/WG11, Coding of Moving Pictures and Audio, Document ISO/IEC JTC1/SC29/WG11 MPEG2015/M36521, Warsaw, Poland, Jul. 2015, pp. 1-12.

* cited by examiner

```
colour_remapping_info( payloadSize ) {                                          Descriptor
    colour_remap_id                                                             ue(v)
    colour_remap_cancel_flag                                                    u(1)
    if( !colour_remap_cancel_flag ) {
        colour_remap_persistence_flag                                           u(1)
        colour_remap_video_signal_info_present_flag                             u(1)
        if( colour_remap_video_signal_info_present_flag ) {
            colour_remap_full_range_flag                                        u(1)
            colour_remap_primaries                                              u(8)
            colour_remap_transfer_function                                      u(8)
            colour_remap_matrix_coefficients                                    u(8)
        }
        colour_remap_input_bit_depth                                            u(8)
        colour_remap_bit_depth                                                  u(8)
        for( c = 0; c < 3; c++ ) {
            pre_lut_num_val_minus1[ c ]                                         u(8)  ─── Piece-wise linear model per
            if( pre_lut_num_val_minus1[ c ] > 0 )                                        component + video range management
                for( i = 0; i <= pre_lut_num_val_minus1[ c ]; i++ ) {                    (1D LUT)
                    pre_lut_coded_value[ c ][ i ]
                    pre_lut_target_value[ c ][ i ]
                }
        }
        colour_remap_matrix_present_flag                                        se(v)  ─── 3x3 matrix
        if( colour_remap_matrix_present_flag ) {                                        Not used (according to am embodiment)
            log2_matrix_denom                                                           Colour-remap_matrix_present_flag = 0
            for( c = 0; c < 3; c++ )
                for( i = 0; i < 3; i++ )
                    colour_remap_coeffs[ c ][ i ]
        }
        for( c = 0; c < 3; c++ ) {
            post_lut_num_val_minus1[ c ]                                               ─── Piece-wise linear model per component (1D
            if( post_lut_num_val_minus1[ c ] > 0 )                                          LUT)
                for( i = 0; i <= post_lut_num_val_minus1[ c ]; i++ ) {                      Not used (according to am embodiment)
                    post_lut_coded_value[ c ][ i ]                                          Pos_lut_num_val_minus1[c] = 0
                    post_lut_target_value[ c ][ i ]
                }
        }
    }
}
```

Fig. 12

METHOD FOR ENCODING AN INPUT VIDEO COMPRISING A LUMA COMPONENT AND TWO CHROMA COMPONENTS, THE METHOD COMPRISING RESHAPING OF SAID INPUT VIDEO BASED ON RESHAPING FUNCTIONS

This application claims the benefit, under 35 U.S.C. § 365 of International Application PCT/EP2017/060766, filed May 5, 2017, which was published in accordance with PCT Article 21(2) on Nov. 16, 2017, in English, and which claims the benefit of European Patent Application No. 16305562.7, filed May 13, 2016.

1. FIELD

The present principles generally relate to video coding using the Colour Remapping Information (CRI) Supplemental Enhancement Information (SEI) message as specified by the HEVC standard edition 2 to perform a colour volume mapping between two given colour volumes (typically corresponding to different colour gamuts and dynamic ranges).

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, a picture contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a colour component. Or, equivalently, the same information may also be represented by a set of arrays of colour samples, such as the traditional tri-chromatic RGB representation.

A pixel value is represented by a vector of C values, where C is the number of components. Each value of a vector is represented with a number of bits which defines a maximal dynamic range of the pixel values.

FIG. 1 illustrates a method for encoding/decoding an input video in accordance with the prior art (HDR CE2: CE2.a-2, CE2.c, CE2.d and CE2.e-3, Taoran Lu, Fangjun Pu, Peng Yin, Tao, JCTVC-W0084). This method describes a solution to achieve improved HDR compression efficiency using HEVC (J. Boyce, J. Chen et al., "Draft high efficiency video coding (HEVC) version 2, combined format range extensions (RExt), scalability (SHVC), and multi-view (MV-HEVC) extensions," JCTVC-R1013, 18th Meeting: Sapporo, J P, 30 June-9 July 2014.), by applying a reshaping of the input HDR signal to convert it in a reshaped video signal easier to compress. For that, metadata are inserted in the bitstream (by the addition of new syntax elements in the SPS/PPS, as described in document "JCTVC-W0092_TestModel_specification.docx", comprised in the JCTVC contribution JCTVC-W0092 untitled "Description of the Exploratory Test Model (ETM) for HDR/WCG extension of HEVC" from authors K. Minoo, T. Lu, P. Yin, L. Kerofsky, D. Rusanovskyy, E. Francois).

At the encoder side, in step 100, a module reshapes the input video to generate a reshaped video and generates metadata associated to the reshaped video. This reshaping may be considered as being a pre-processing applying before the encoding of the video signal.

In step 110, the reshaped video plus its associated metadata are encoded in a bitstream F.

At the decoding side, in a step 120, a module decodes the bitstream F and generates a decoded reshaped video, and decoded metadata.

In step 130, a module inverse-reshapes the decoded reshaped video, using the decoded metadata, to generate a reconstructed video, that is conform to the input video (apart from the compression artefacts). This inverse-reshaping may be considered as being a post-processing.

FIG. 2 shows schematically the details of the encoding side of the method of FIG. 1.

In step 100, the pre-processing is based on three reshaping functions $f_{Rk}()$ for k=0, 1 or 2: one for luma $f_{R0}()$ based on piece-wise polynomial model (PWP), with 8 pieces, plus two ones for chroma $f_{R1}()$ and $f_{R2}()$, based on piece-wise linear model (PWL), with 1 single piece. Actually, what is modeled is the inverse of these functions, $invf_{Rk}()$ for k=0, 1 or 2 (such that for any x, $invf_{Rk}(f_{Rk}(x))=x$), since this is what has to be applied at decoder side in the post-processing. From these modeled inverse-reshaping functions, the reshaping functions $g_{rk}()$ that are actually applied in pre-processing are the inverse of the inverse-reshaping functions $invf_{Rk}()$. The inverse-reshaping functions are typically implemented in the shape of 1D look-up-tables (LUT).

In step 110, a module encodes the reshaped video in a bitstream and embeds the parameters of these models, called the reshaping parameters, as metadata in the PPS.

In brief, during the pre-processing, luma reshaping parameters (luma PWP params) and chroma reshaping parameters (chroma PWL parameters) are derived from an input video. These reshaping parameters are then used to reshape the input video. The resulting reshaped video is then encoded in the bitstream and the reshaping parameters are then encoded as metadata in the bitstream.

FIG. 3 shows schematically the details of the decoding of the method of FIG. 1.

In step 120, the decoded reshaped video and the metadata (reshaping parameters) are obtained by decoding the bitstream, luma and chroma inverse-reshaping functions or LUTs are derived from the decoded reshaping parameters and an inverse-reshaping is applied to the decoded reshaped video based on these luma and chroma inverse-reshaping functions or LUTs.

The inverse-reshaping includes the following specific signal range management.

To really benefit from the full range of the code-words used to represent the video, the reshaped video is generated in full range (meaning that all the values from 0 to 1023, in case of 10-bits signal, are used). However in real rendering devices, what is used is limited (or legal) range (typically values from 64 to 960). So in the method of FIG. 1, the reshaping and inverse-reshaping implement a specific signal range management so that the input video in limited range is converted to a reshaped video in full range, and the full range decoded reshaped video is converted to a limited range reconstructed video.

This specific signal range management should be normative.

A drawback of this reshaping mechanism is that it is mandatory to modify the HEVC codec and specification for combining it with HEVC.

3. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy the drawback of the reshaping process described in relation with FIGS. 1-3 by adapting the usage of the Colour Remapping Information (CRI) SEI message defined in HEVC in order to perform a reshaping mechanism equivalent, in term of coding efficiency, to the mechanism described above in relation with FIG. 1-3.

More precisely, the present principles consist in taking into account directly in the CRI parameters the management of the range of both the input video (to be converted by the inverse CRI mechanism that implements the reshaping) and the output video (resulting of the conversion by the CRI mechanism that implements the inverse reshaping).

Using the CRI mechanism for managing the range of the input and output video of a reshaping process is an unusual use of CRI which avoids any modification of the HEVC encoder and decoder.

According to on if their aspects, the present principles relate to a method for encoding an input video comprising a luma component and two chroma components. The method comprises:

reshaping of said input video by applying (610) piece-wise linear functions to the luma and chroma components;

encoding the reshaped video into a bitstream; and encoding parameters representative of said piece-wise linear functions as side information;

and the method is characterized in that reshaping of said input video further depends on a targeted range of a decoded reshaped video and the range of a reconstructed video after an inverse-reshaping is applied on the decoded reshaped video.

According to an embodiment, the method further comprises encoding a first information data which determines said targeted range of a decoded reshaped video and a second information data which determines said range of a reconstructed video as side information.

According to another of its aspects, the present principles relate to a method for decoding a reconstructed video from a bitstream. The method comprised obtaining a decoded reshaped video by decoding the bitstream and obtaining the reconstructed video by inverse-reshaping the decoded reshaped video. The method is characterized in that said inverse-reshaping of said decoded reshaped video depends on a targeted range of said decoded reshaped video and the range of a reconstructed video after said inverse-reshaping is applied on said decoded reshaped video.

According to an embodiment, the decoding method further comprises obtaining a first information data which determines said targeted range of a decoded reshaped video and a second information data which determines said range of a reconstructed video from side information.

According to an embodiment, one of the above methods further comprises representing each piece-wise linear function by a 1D Look-Up-Table.

According to an embodiment, one of the above methods, the method further comprises checking the status of the first information data and the status of the second information data in order to determine if an expected status is reached;

then, if a first expected status is reached, the piece-wise linear functions are multiplied by a scaling factor lower than 1 and an non null offset value is added to the piece-wise linear function;

then, if a second expected status is reached, the piece-wise linear functions are multiplied by a scaling factor lower than 1;

then, if a third expected status is reached, the piece-wise linear functions are multiplied by a scaling factor equals to 1.

According to a variant of one of the above methods, side information is carried on using the Colour Remapping Information Supplemental Enhancement Information message as specified by the HEVC standard edition 2.

According to another of its aspects, the present principles relate to a device for encoding an input video comprising a luma component and two chroma components. The device comprises means for:

reshaping of said input video by applying a piece-wise linear function to the luma component and two other piece-wise linear functions to the chroma components;

encoding the reshaped video into a bitstream; and encoding parameters representative of said piece-wise linear functions as side information.

The device is characterized in that the means for reshaping of said input video further depend on a targeted range of a decoded reshaped video and the range of a reconstructed video after an inverse-reshaping is applied on the decoded reshaped video.

According to another of its aspects, the present principles relate to a device for decoding a reconstructed video from a bitstream, comprising means for obtaining a decoded reshaped video by decoding the bitstream and means for obtaining the reconstructed video by inverse-reshaping the decoded reshaped video. The device is characterized in that the inverse-reshaping of said decoded reshaped video further depends on a targeted range of said decoded reshaped video and the range of a reconstructed video after said inverse-reshaping is applied on said decoded reshaped video.

According to another of its aspects, the present principles relate to a signal carrying an encoded reshaped video. The signal is characterized in that it further carries a first information data which determines a targeted range of a decoded reshaped video and a second information data which determines a range of a reconstructed video after an inverse-reshaping is applied on the decoded reshaped video.

According to other of their aspects, the present principles relate to a device comprising a processor configured to implement the above methods, a computer program product comprising program code instructions to execute the steps of the above method when this program is executed on a computer and a non-transitory storage medium carrying instructions of program code for executing steps of the above method when said program is executed on a computing device.

The specific nature of the present principles as well as other objects, advantages, features and uses of the present principles will become evident from the following description of examples taken in conjunction with the accompanying drawings.

4. BRIEF DESCRIPTION OF DRAWINGS

In the drawings, examples of the present principles are illustrated. It shows:

FIG. 12 illustrates an example of the syntax of the CRI SEI message as defined in HEVC in accordance with an example of the present principles.

Similar or same elements are referenced with the same reference numbers.

6. DESCRIPTION OF EXAMPLE OF THE PRESENT PRINCIPLES

Figure 1:
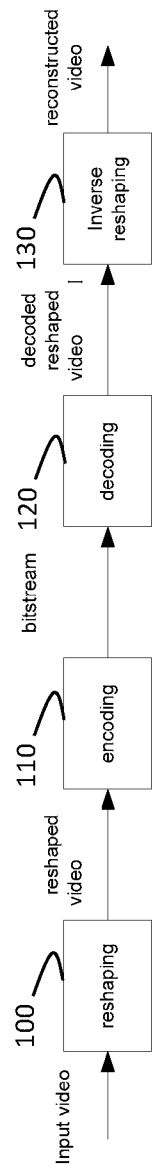
FIG. 1 illustrates a method for encoding/decoding an input video in accordance with the prior art.
Figure 2:
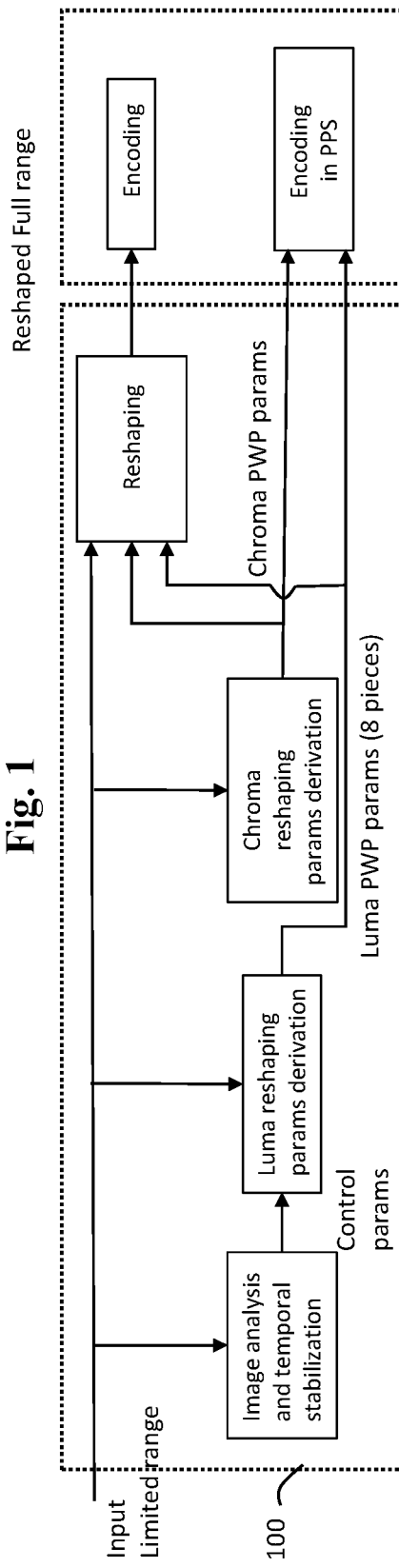
FIG. 2 shows schematically the details of the encoding of the method of FIG. 1.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding n picture but extends to the encoding/decoding of a sequence of pictures (video) because each picture of the sequence is sequentially encoded/decoded as described below.

The present principles propose to use the CRI parameters in place of the metadata of the reshaping process as described in the introducing part.

One of the benefits is that no change is required to the HEVC specification, while the compression improvements offered by the reshaping mechanism described in the introducing part are preserved. The main point of the present disclosure is to properly manage the range of the input and output video signals after the reshaping, or after the inverse-reshaping.

Figure 4:
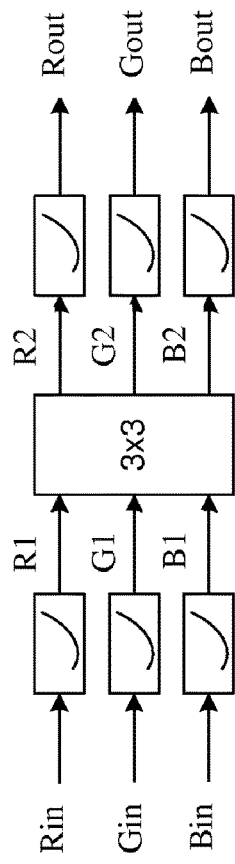
FIG. 4 illustrates a Colour Remapping model as defined in HEVC.

The Colour Remapping Information (CRI) SEI message defined in HEVC conveys information that is used to map pictures from one colour volume to another one. The CRI SEI message carries CRI parameters which are obtained according to a Colour Remapping model illustrated in FIG. 4.

Such a Colour Remapping model includes three parts: a first piece-wise linear function applied to each colour component (Pre-LUT), followed by a three-by-three matrix applied to the three resulting colour components, followed by a second piece-wise linear function applied to each resulting colour component (Post-LUT).

Each one of these set of data is optional (for instance only the first 1D Pre-LUTs can apply), leading to the application of only one transfer function to each colour component of the input signal. A maximum of 33 points are coded to specify the piece-wise linear functions.

The following equations illustrate the application of this model to the ($R_{in}$, $G_{in}$, $B_{in}$) values of an input colour sample (this could also apply to other colour representation, such as YCbCr):

$$\begin{bmatrix} R_1 \\ G_1 \\ B_1 \end{bmatrix} = \begin{bmatrix} PreLUT[R_{in}] \\ PreLUT[G_{in}] \\ PreLUT[B_{in}] \end{bmatrix}$$

$$\begin{bmatrix} R_2 \\ G_2 \\ B_2 \end{bmatrix} = M_{3 \times 3} \begin{bmatrix} R_1 \\ G_1 \\ B_1 \end{bmatrix}$$

$$\begin{bmatrix} R_{out} \\ G_{out} \\ B_{out} \end{bmatrix} = \begin{bmatrix} PostLUT[R_2] \\ PostLUT[G_2] \\ PostLUT[B_2] \end{bmatrix}$$

As the input and output bit depths can be different, the model can support both the range conversion between a standard dynamic range (SDR) and a High Dynamic Range (HDR) and/or between different colour volumes (typically corresponding to different colour gamuts and dynamic ranges).

Figure 5:
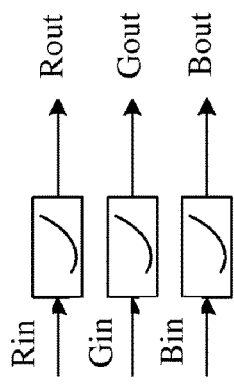
FIG. 5 illustrates the Colour Remapping model in accordance with an example of the present principles.
Figure 6:
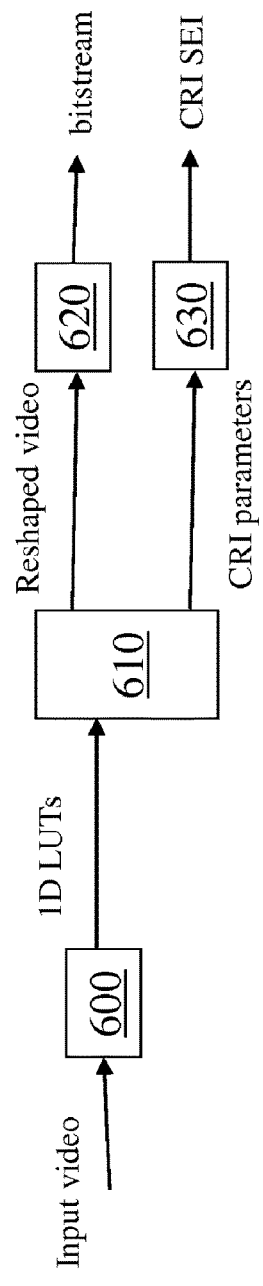
FIG. 6 shows schematically the details of the encoding in accordance with an example of the present principles.

In the following, the Colour Remapping model as above described is limited to three 1D LUTs (representing each a piecewise linear function) as illustrated in FIG. 5. The 3×3 matrix and the three post 1D LUTS that are usual additional data of the CRI parameters are not used here. In FIG. 5 and FIG. 6, the CRI applies to the three R, G, and B components of the video signal. The CRI can also apply to colour samples represented in other color representation, such as YCbCr. This is what is recommended for the invention. By disabling the 3×3 matrix and the three post 1D LUTS, advantageously, the CRI can directly apply to the 4:2:0 YCbCr signal, in which the chroma components Cb and Cr have half the resolution of the luma component. If the 3×3 matrix applies, an upsampling of chroma is required.

FIG. 6 shows schematically the details of the steps of the encoding in accordance with an example of the present principles.

In step 600, a module determines three 1D LUTs of a CRI model, representing each a piecewise linear inverse-reshaping function: One 1D LUT for luma, and two 1D LUTs for chroma with, for example 1 single piece.

In step 610, a module obtains a reshaped video by applying the inverse of the 1D LUT for luma to the luma component of the input video and the inverse of the two 1D LUTs for chroma to the chroma component of the input video.

In step 620, a module encodes the reshaped video in a bitstream and in step 630, a module embeds the CRI parameters (relative to the three 1D LUTs) in a CRI SEI message as defined in HEVC standard.

The CRI parameters consist for each 1D LUT c, c=0, 1 or 2, of a set of points (pre_lut_coded_value[c][i], pre_lut_target_value[c][i]), with i=0 to pre_lut_num_val_minus1[c], as explained in sections D.2.33 and D.3.33 of document JCTVC-R1013 (J. Boyce, J. Chen et al., "Draft high efficiency video coding (HEVC) version 2, combined format range extensions (RExt), scalability (SHVC), and multi-view (MV-HEVC) extensions," JCTVC-R1013, 18th Meeting: Sapporo, J P, 30 June-9 July 2014). These points model the piece-wise linear function $invf_{Rc}(x)$ (inverse-reshaping function for a component c). For instance, for x in pre_lut_coded_value[c][i] and pre_lut_coded_value[c][i+1], the function $invf_{Rc}(x)$ corresponds to the segment linking the points (pre_lut_coded_value[c][i], pre_lut_target_value[c][i]) and (pre_lut_coded_value[c][i+1], pre_lut_target_value[c][i+1]). The LUT $LUT_{Rc}$ implementing $invf_{Rc}(x)$ is typically built as follows:

$LUT_{Rc}[x]$=Round($invf_{Rc}(x)$) for x=[0, 1023] for a 10-bit signal, where Round(x) is the function giving the nearest integer value of x.

Figure 7:
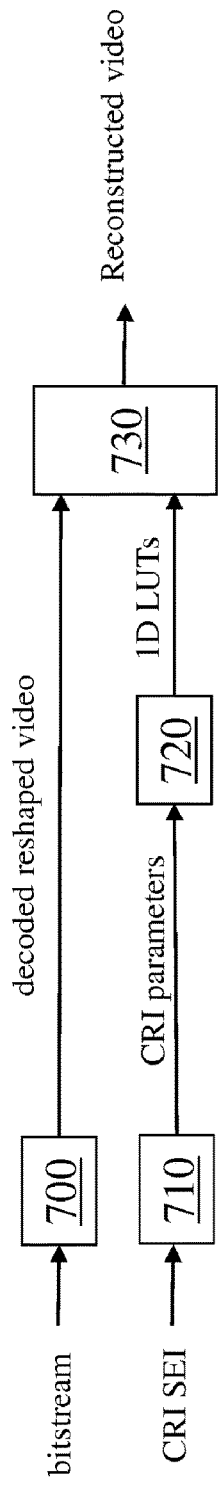
FIG. 7 shows schematically the details of the steps of the decoding in accordance with an example of the present principles.

FIG. 7 shows schematically the details of the steps of the decoding in accordance with an example of the present principles.

In step 700, a module obtains a decoded reshaped video by decoding a bitstream.

In step 710, a module obtains CRI parameters from a received CRI SEI message.

In step 720, three 1D LUTs, one for luma and two for chroma, are obtained from the CRI parameters.

In step 730, a module obtains a reconstructed video by inverse-reshaping the decoded reshaped video based on these three 1D LUTs.

The encoding/decoding scheme described in relation with FIGS. 6 and 7 avoid any amendment of the HEVC standard for combining the reshaping mechanism with the HEVC encoding/decoding process.

According to an embodiment of the step 600, the three 1D LUTs are determined in order to better exploit the codewords range i.e to get improved compression.

The three 1D LUTs representing the inverse-reshaping functions are determined from a picture of the input video.

Three 1D LUTs may be determined for each picture of the input video, or alternatively the same three LUTs may be used for several pictures or for all the pictures of the input video.

For example, a 1D LUT representing a reshaping function F(L) for luma is determined from a picture of the input video as follows:

First, an average linear-light luminance $L_{mean}$ is estimated for the picture. Only luminance samples above a minimum threshold $L_{min}$ are taken into account. Typically, $L_{min}$ is set to 0.1 nits.

The reshaping function F(L) for luma is defined as follows:

$$F(L) = \log(1.+(L/S)g)/\log(1.+(P/S)g) \qquad (1)$$

where L is the linear-light input luminance of the picture, P is a mastering display peak luminance, S and g are two control parameters. Typically g is fixed and set to 2.8.

The control parameter S is picture-dependent, and is derived from $L_{mean}$ as follows:

$$S = a*L_{mean}^2 + b*L_{mean} + c$$

The parameters a, b and c are heuristically determined, based on a various set of content, as a=−0.0003, b=0.558, c=4.6767.

Temporal smoothing of the control parameter S value may be performed to avoid strong temporal variations.

The 1D LUT representing a reshaping function F(L) for luma is then obtained in order that each value of the input video matches a code value obtained by applying the reshaping function F(L) to said value of the input video.

Next, an inverse of said 1D LUT representing a reshaping function F(L) for luma is obtained by inversing said 1D LUT representing a reshaping function F(L) for luma. Said inverse 1D LUT represents a piecewise-linear model of the inverse-reshaping function. The model has 9, 17 or 33 points for example. The parameters of said a piece-wise linear model are the CRI parameters which are embedded in the CRI SEI message.

For example, a 1D LUT representing a reshaping function for chroma is determined from a picture of the input video as being a simple scaling using scaling factor and an offset.

This is based on the fact that in general the real gamut of content is smaller than the gamut of the container used to code it. For instance, it is expected that UHD video in the near future will be represented in a BT.2020 container, but the content will actually be limited to P3 colours.

To compensate the difference in colour volumes between BT.709/P3 and BT.2020 colour representation at the encoder side, a chroma reshaping function is a single piecewise-linear model as follows:

$$y_{Cb} = S_{cb} * (x_{cb} - O_{cb})$$

$$y_{Cr} = S_{cr} * (x_{cr} - O_{cr}) \qquad (2)$$

where $x_{Cr}$ and $x_{cb}$ are input chroma samples, $y_{cb}$ and $y_{cr}$ are output of the forward chroma reshaper, and $S_{cr}$, $S_{cb}$ are scaling factors and $O_{cr}$, $O_{cb}$ are offset typically set to 512 for 10b bitDepth chroma samples.

For example, the scaling factors $S_{cr}$, $S_{cb}$ and offsets $O_{cr}$, $O_{cb}$ may be derived from correspondence of colour primaries for a native colour gamut of input video and colour primaries of a target colour container, as shown in next table.

| Colour space | White point | | Primary colours | | | | | |
|---|---|---|---|---|---|---|---|---|
| | $x_W$ | $y_W$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

For example, the scaling factors $S_{cr}$, $S_{cb}$ are computed as follows:

$$S_{cb} = \sqrt{\left(\frac{tD_B}{nD_B}\right)^2 + \left(\frac{tD_G}{2*nD_G}\right)^2}$$

$$S_{cr} = \sqrt{\left(\frac{tD_R}{nD_R}\right)^2 + \left(\frac{tD_G}{nD_G}\right)^2}$$

where $tD_R$, $tD_G$ and $tD_B$ are variables derived from a target colour gamut defined by colour primaries $(x_R, x_G, x_B)$ and white point $(x_w, y_w)$:

$$tD_R = \sqrt{(x_R - x_W)^2 + (y_R - y_W)^2}$$

$$tD_G = \sqrt{(x_G - x_W)^2 + (y_G - y_W)^2}$$

$$tD_B = \sqrt{(x_B - x_W)^2 + (y_B - y_W)^2}$$

$nD_R$, $nD_G$ and $nD_B$ are variables derived from a native colour gamut defined by colour primaries $(x_R, x_G, x_B)$ and white point $(x_w, y_w)$:

$$nD_R = \sqrt{(x_R - x_W)^2 + (y_R - y_W)^2}$$

$$nD_G = \sqrt{(x_G - x_W)^2 + (y_G - y_W)^2}$$

$$nD_B = \sqrt{(x_B - x_W)^2 + (y_B - y_W)^2}$$

According to a variant of the step 610, the module obtains the reshaped video according to a first information data called VFR which determines a targeted range of the decoded reshaped video (output of step 700) and to a second information data called CRFR which determines the range of the reconstructed video (output of step 730).

Figure 3:
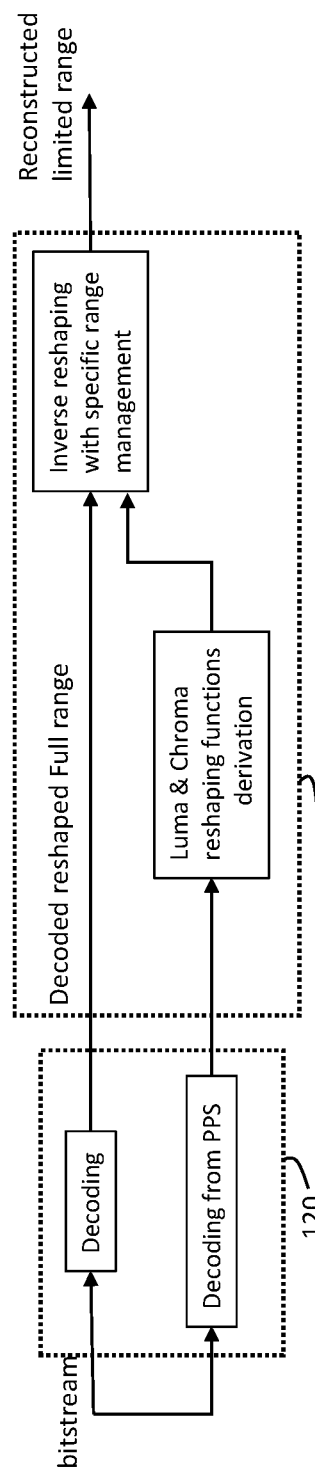
FIG. 3 shows schematically the details of the decoding of the method of FIG. 1.

According to this variant of the encoding/decoding scheme, no explicit range management is required at the decoding side as in the prior art (step 130, FIG. 3) because the range management is then considered during the computing of the three 1D LUTs (step 610).

Figure 8:
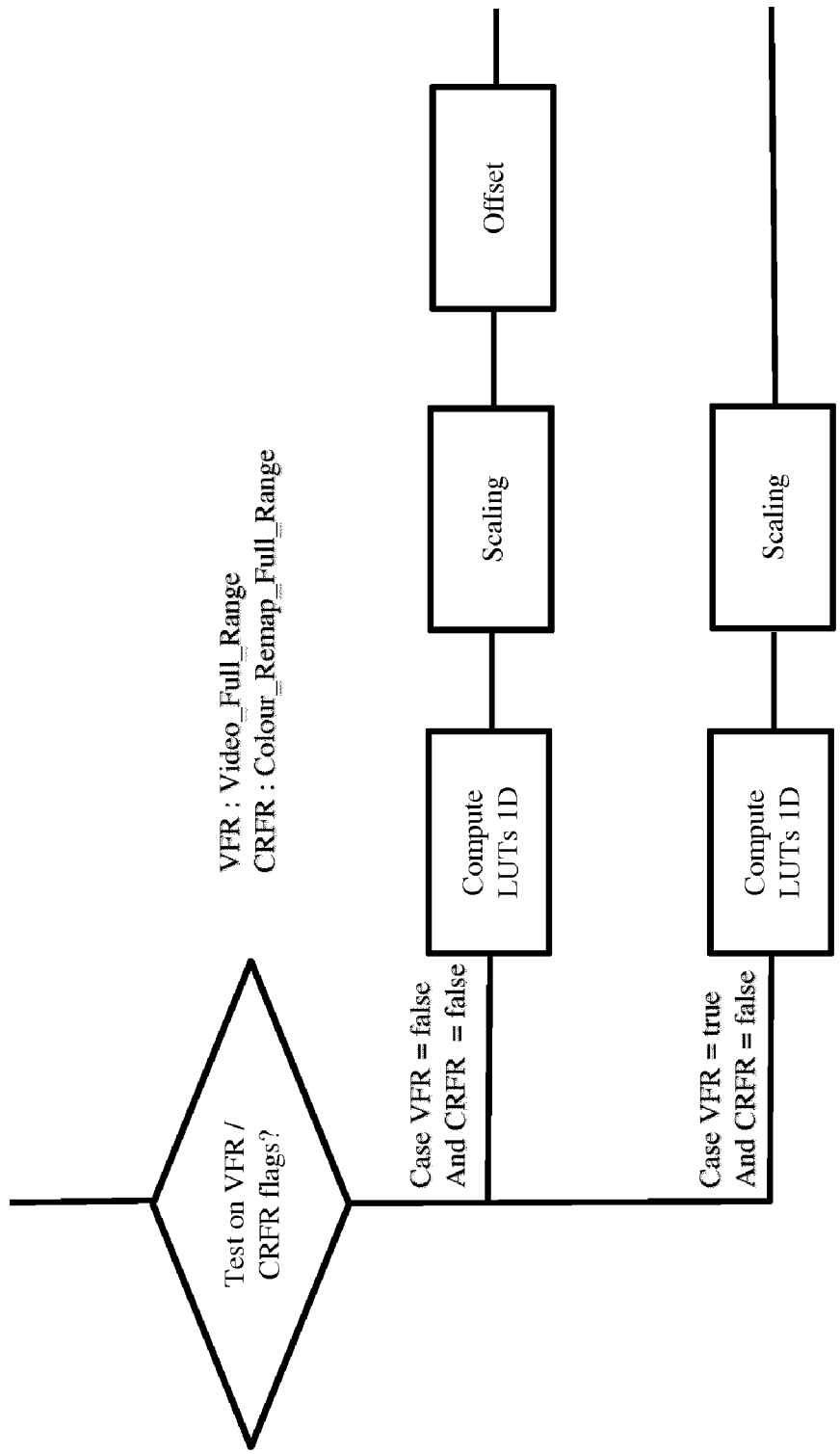
FIG. 8 illustrates an example of range management in accordance with the variant of the step 610.

FIG. 8 illustrates an example of range management in accordance with the variant of the step 610.

According to this example, the first and second information data may have either the status "true" or "false".

First, a module checks the status of the first information VFR and the status of the second CRFR when present (or intended to be present) in the bitstream.

Then, if the status of the first information VFR equals false and the status of the second information data CRFR equals false, the three 1D LUTS are determined from the following equations (3) and (4) applying for 10-bit signal, with offset equal to 64:

For luma:

$$LUT_{R0}[i] = \text{Clip}(876/1023 * invf_{R_0}(i) + \text{offset} + 0.5, 0, 1023) \qquad (3)$$

For chroma, for k=1 or 2:

$$LUT_{Rk}[i] = \text{Clip}(896/1023 * (invf_{R_k}(i) - 512) + 512 + 0.5, 0, 1023) \qquad (4)$$

If the status of the first information VFR equals true and the status of the second information data CRFR equals false, the three 1D LUTS are determined from the equations (3) and (4) but with offset equal 0.

For the other combinations of the status of the first and second information status, no scaling nor offset apply.

For luma:

$$LUT_{R0}[i] = \text{Clip}(invf_{R_0}(i) + 0.5, 0, 1023) \qquad (5)$$

For chroma, for k=1 or 2:

$$LUT_{Rk}[i] = \text{Clip}(invf_{R_k}(i) + 0.5, 0, 1023) \qquad (6)$$

For instance, $LUT_{Rk}$ for the chroma components model the inverse of the reshaping functions implemented by eq. 1 and 2

According to an embodiment, illustrated in FIG. 12, the first information data is a syntax element of the HEVC signalling.

Preferably said syntax element is the flag "video_full_range_flag" of the VUI (Video Usability Information) which indicates the range of the decoded reshaped video. According to the HEVC standard edition 2, the syntax element video_full_range_flag indicates the black level and range of the luma and chroma signals as derived from E'Y, E'PB, and E'PR or E'R, E'G and E'B real-valued component signals. When the video_full_range_flag syntax element is not present, the value of video_full_range_flag is inferred to be equal to 0.

Note that it is not mandatory to set VUI parameters in the bitstream, furthermore when VUI is in the bitstream it is not mandatory to set the "video_full_range_flag".

According to this example, the second information data is a syntax element of the HEVC signaling.

Preferably, said syntax element is the "colour_remap_full_range_flag" of the VUI which indicates the range of the reconstructed video According to the HEVC standard edition 2, when the CRI mechanism is used, there is a syntax element "colour_remap_full_range_flag" in the bitstream to indicate the range of the colour remapped video. This syntax element (colour_remap_full_range_flag) may be embedded in a CRI SEI message.

The "colour_remap_full_range_flag" syntax element has the same semantics as specified in clause E.3.1 for the video_full_range_flag syntax element, except that colour_remap_full_range_flag specifies the colour space of a picture of the reconstructed video, rather than the colour space used for the CLVS. CLVS stands for coded layer-wise video sequence and corresponds to a sequence of pictures and the associated data, not related to the pictures, that are required to described the video sequence (such as size of the pictures, frame rate of the video, bit-depth of the picture samples).

When not present, the value of the "colour_remap_full_range_flag" syntax element is inferred to be equal to the value of "video_full_range_flag" syntax element.

For instance, the reshaped video can be generated in full range, as well as the decoded reshaped video, while, for application purposes, the reconstructed video as well as the input video are in limited range.

The signal to be encoded is made of code-words, typically from 0 to 1023 for 10-bit signal. These code-words result from the application of a so-called "transfer function" which enables to convert a linear-light signal to code-word values adapted to the encoder and decoder interfaces (or inversely from code-words to linear-light signal). As the reshaped signal is based on adaptive transfer functions not specified in the VUI transfer functions of HEVC specification (in section E.2.1 of document JCTVC-R1013), it is recommended to set the VUI syntax element "transfer_characteristics" to "Unspecified". In the CRI message, the colour_remap_transfer_function syntax element should be set to the index of the transfer function of the input video signal, as specified in table E.4 of document JCTVC-R1013. For instance, if the input signal is an HDR video represented with the ST 2084 transfer function, which index in table E.4 of document JCTVC-R1013 is 16, colour_remap_transfer_function syntax element should be set to 16.

The decoder (steps 700, 710) is configured to decode data which have been encoded by the encoder (respectively steps 620, 630).

The encoder (and decoder) is not limited to a specific encoder able to encode/decode a video and metadata such as the HEVC encoder (decoder).

The steps for generating the reshaping functions applied in the pre-processing are summarized as follows:
Derivation of the reshaping functions $f_{Rc}$, for c=0,1,2
Derivation of the inverse reshaping functions $invf_{Rc}$, for c=0,1,2

Modeling of the inverse reshaping functions $invf_{Rc}$, for c=0,1,2 by PWP models, PreLUTc, with proper range management
Derivation of the inverse functions $g_{Rc}$ derived from the PWP models, PreLUTc, for c=0,1,2
Reshaping using the functions $g_{Rc}$, for c=0,1,2
Coding of the PWP models of PreLUTc, for c=0,1,2
In the post-processing, the steps are summarized as follows:
decoding of the PWP models, and generation of PreLUTc, for c=0,1,2
inverse reshaping by application of the PreLUTc, for c=0,1,2

On FIG. 1-8, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively<<Application Specific Integrated Circuit>>, <<Field-Programmable Gate Array>>, <<Very Large Scale Integration>>, or from several integrated electronic components embedded in a device or from a blend of hardware and software components.

Figure 9:
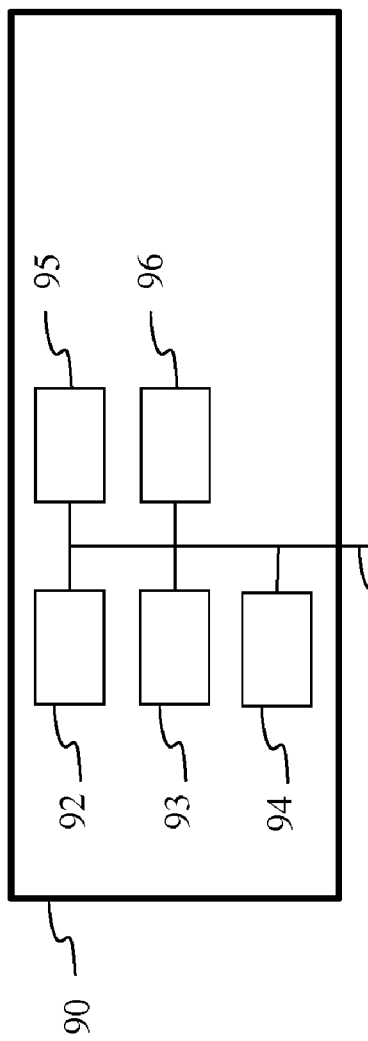
FIG. 9 shows an example of an architecture of a device in accordance with an example of present principles.

FIG. 9 represents an exemplary architecture of a device 90 which may be configured to implement a method described in relation with FIG. 1-8.

Device 90 comprises following elements that are lined together by a data and address bus 91:
a microprocessor 92 (or CPU), which is, for example, a DSP (or Digital Signal Processor);
a ROM (or Read Only Memory) 93;
a RAM (or Random Access Memory) 94;
an I/O interface 95 for reception of data to transmit, from an application; and
a battery 96.

In accordance with an example, the battery 96 is external to the device.

In each of mentioned memory, the word <<register>> used in the specification can correspond to area of small capacity (some bits) or to very large area (e.g. a whole program or large amount of received or decoded data). The ROM 93 comprises at least a program and parameters. The ROM 93 may store algorithms and instructions to perform techniques in accordance with present principles. When switched on, the CPU 92 uploads the program in the RAM and executes the corresponding instructions.

RAM 94 comprises, in a register, the program executed by the CPU 92 and uploaded after switch on of the device 90, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the input video is obtained from a source. For example, the source belongs to a set comprising:
- a local memory (93 or 94), e.g. a video memory or a RAM (or Random Access Memory), a flash memory, a ROM (or Read Only Memory), a hard disk ;
- a storage interface (95), e.g. an interface with a mass storage, a RAM, a flash memory, a ROM, an optical disc or a magnetic support;
- a communication interface (95), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a
- CCD (or Charge-Coupled Device) or CMOS (or Complementary Metal-Oxide-Semiconductor)).

In accordance with an example of the decoding or a decoder, the decoded picture I is sent to a destination; specifically, the destination belongs to a set comprising:
- a local memory (93 or 94), e.g. a video memory or a RAM, a flash memory, a hard disk ;
- a storage interface (95), e.g. an interface with a mass storage, a RAM, a flash memory, a ROM, an optical disc or a magnetic support;
- a communication interface (95), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, a bitstream and a CRI SEI message are sent to a destination. As an example, one of bitstream and a CRI SEI message are stored in a local or remote memory, e.g. a video memory (94) or a RAM (94), a hard disk (93). In a variant, one or both bitstreams are sent to a storage interface (95), e.g. an interface with a mass storage, a flash memory, ROM, an optical disc or a magnetic support and/or transmitted over a communication interface (95), e.g. an interface to a point to point link, a communication bus, a point to multipoint link or a broadcast network.

In accordance with examples of decoding or decoder, the bitstream and a CRI SEI message are obtained from a source. Exemplarily, the bitstream is read from a local memory, e.g. a video memory (94), a RAM (94), a ROM (93), a flash memory (93) or a hard disk (93). In a variant, the bitstream is received from a storage interface (95), e.g. an interface with a mass storage, a RAM, a ROM, a flash memory, an optical disc or a magnetic support and/or received from a communication interface (95), e.g. an interface to a point to point link, a bus, a point to multipoint link or a broadcast network.

In accordance with examples, device 90 being configured to implement an encoding method described in relation with FIG. 6, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

In accordance with examples, device 90 being configured to implement a decoding method described in relation with FIG. 7, belongs to a set comprising:
- a mobile device;
- a communication device;
- a game device;
- a set top box;
- a TV set;
- a tablet (or tablet computer);
- a laptop;
- a display and
- a decoding chip.

Figure 10:
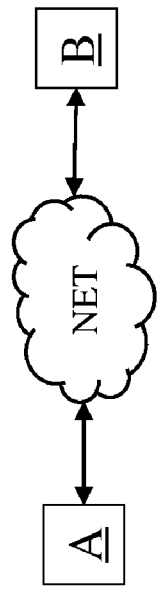
FIG. 10 shows two remote devices communicating over a communication network in accordance with an example of present principles.

According to an example of the present principles, illustrated in FIG. 10, in a transmission context between two remote devices A and B over a communication network NET, the device A comprises a processor in relation with memory RAM and ROM which are configured to implement a method for encoding a picture as described in relation with the FIG. 6 and the device B comprises a processor in relation with memory RAM and ROM which are configured to implement a method for decoding as described in relation with FIG. 7.

In accordance with an example, the network is a broadcast network, adapted to broadcast still pictures or video pictures from device A to decoding devices including the device B.

A signal, intended to be transmitted by the device A, carries the bitstream and/or the CRI SEI message. The bitstream comprises an encoded reshaped video as explained before. This signal may further comprise CRI parameters representative of an inverse-reshaping intended to be applied to the decoded reshaped video.

Figure 11:
FIG. 11 shows the syntax of a signal in accordance with an example of present principles.

FIG. 11 shows an example of the syntax of such a signal when the data are transmitted over a packet-based transmission protocol. Each transmitted packet P comprises a header H and a payload PAYLOAD. At least one bit of the payload PAYLOAD, for example, is dedicated to represent the CRI parameters representative of an inverse-reshaping intended to be applied to the decoded reshaped video.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
encoding an input video comprising a luma component and two chroma components represented by code words, wherein the encoding method comprises:
reshaping of the input video by applying at least one piece-wise linear function to extend a range of the code words of the luma and chroma components to a full range;
encoding the reshaped input video into a bitstream; and
encoding parameters representative of the at least one piece-wise linear function as side information;
wherein reshaping of the input video depends on a targeted range of a decoded reshaped video and a range of code words representing a reconstructed video after an inverse-reshaping is applied on the decoded reshaped video.

2. The method of claim 1, wherein the method further comprises encoding a first information data that determines the targeted range of a decoded reshaped video and a second information data that determines the range of a reconstructed video as the side information.

3. A method comprising:
decoding a reconstructed video from a bitstream, wherein the decoding comprises:
obtaining a decoded reshaped video by decoding the bitstream; and
obtaining the reconstructed video by inverse-reshaping the decoded reshaped video;
wherein the inverse-reshaping of the decoded reshaped video depends on a targeted range of the decoded reshaped video and a range of a reconstructed video after the inverse-reshaping is applied on the decoded reshaped video, wherein the inverse-reshaping increases a range of codewords representing at least one component of the decoded reshaped video.

4. The method of claim 3, wherein the method further comprises obtaining a first information data that determines the targeted range of a decoded reshaped video and a second information data that determines the range of a reconstructed video from side information.

5. The method of claim 1, wherein the method further comprises representing the at least one piece-wise linear function by a 1D Look-Up-Table.

6. The method of claim 2, wherein the method further comprises checking a status of the first information data and a status of the second information data to determine if an expected status is reached;
then, if a first expected status is reached, the at least one piece-wise linear function is multiplied by a scaling factor lower than 1 and a non-null offset value is added to the at least one piece-wise linear function;
then, if a second expected status is reached, the at least one piece-wise linear function is multiplied by a scaling factor lower than 1;
then, if a third expected status is reached, the at least one piece-wise linear function is multiplied by a scaling factor equal to 1.

7. The method of claim 1, wherein the side information is carried on using a Color Remapping Information Supplemental Enhancement Information message as specified by HEVC standard edition 2.

8. A device for encoding an input video comprising a luma component and two chroma components represented by code words, the device comprising a processor configured to:
reshape the input video by applying a piece-wise linear function to the luma component and two other piece-wise linear functions to the chroma components to extend a range of the code words to a full range;
encode the reshaped video into a bitstream; and encode parameters representative of the piece-wise linear functions as side information;

wherein reshaping of the input video depends on a targeted range of a decoded reshaped video and a range of code words representing a reconstructed video after an inverse-reshaping is applied on the decoded reshaped video.

9. A device for decoding a reconstructed video from a bitstream, comprising a processor configured to obtain a decoded reshaped video by decoding the bitstream and to obtain the reconstructed video by inverse-reshaping the decoded reshaped video, wherein the inverse-reshaping of the decoded reshaped video depends on a targeted range of the decoded reshaped video a range of a reconstructed video after the inverse-reshaping is applied on the decoded reshaped video, wherein the inverse-reshaping increases a range of codewords representing at least one component of the decoded reshaped video.

10. A non-transitory storage medium carrying instructions of program code for executing steps of the method according to claim 1, when the program is executed on a computing device.

11. A non-transitory storage medium carrying instructions of program code for executing steps of the method according to claim 3, when the program is executed on a computing device.

12. The device of claim 9, wherein the processor is further configured to obtain a first information data that determines the targeted range of a decoded reshaped video and a second information data that determines the range of a reconstructed video from side information.

13. The device of claim 9, wherein the processor is further configured to represent at least one piece-wise linear function by a 1D Look-Up-Table.

14. The device of claim 12, wherein the processor is further configure to check a status of the first information data and a status of the second information data in order to determine if an expected status is reached;

then, if a first expected status is reached, the piece-wise linear functions are multiplied by a scaling factor lower than 1 and a non-null offset value is added to the piece-wise linear function;

then, if a second expected status is reached, the piece-wise linear functions are multiplied by a scaling factor lower than 1;

then, if a third expected status is reached, the piece-wise linear functions are multiplied by a scaling factor equal to 1.

15. The device of claim 12, wherein the side information is carried on using a Color Remapping Information Supplemental Enhancement Information message as specified by HEVC standard edition 2.

16. The method of claim 3, wherein the method further comprises representing each piece-wise linear function by a 1D Look-Up-Table.

17. The method of claim 4, wherein the method further comprises checking a status of the first information data and a status of the second information data in order to determine if an expected status is reached;

then, if a first expected status is reached, the piece-wise linear functions are multiplied by a scaling factor lower than 1 and a non-null offset value is added to the piece-wise linear function;

then, if a second expected status is reached, the piece-wise linear functions are multiplied by a scaling factor lower than 1;

then, if a third expected status is reached, the piece-wise linear functions are multiplied by a scaling factor equals to 1.

* * * * *

UNITED STATES PATENT AND TRADEMARK OFFICE
CERTIFICATE OF CORRECTION

PATENT NO. : 10,873,764 B2
APPLICATION NO. : 16/301007
DATED : December 22, 2020
INVENTOR(S) : Franck Hiron et al.

It is certified that error appears in the above-identified patent and that said Letters Patent is hereby corrected as shown below:

In the Claims

At Column 15, Line 67, Claim 1, replace "method comprises:" with --comprises:--

At Column 17, Line 14, Claim 9, replace "video" with --video and--

At Column 18, Line 35, Claim 17, replace "equals" with --equal--

Signed and Sealed this
Twenty-eighth Day of May, 2024

Katherine Kelly Vidal
*Director of the United States Patent and Trademark Office*